US012637381B2

(12) United States Patent
Simon

(10) Patent No.: US 12,637,381 B2
(45) Date of Patent: May 26, 2026

(54) MULTIVARIABLE VERTICAL GLASS DISTRIBUTION CONTROL USING SOFT SENSOR AND METHODS

(71) Applicant: Emhart Glass S.A., Steinhausen (CH)

(72) Inventor: Jonathan S. Simon, Pleasant Valley, CT (US)

(73) Assignee: Emhart Glass S.A., Steinhausen (SE)

( * ) Notice: Subject to any disclaimer, the term of this patent is extended or adjusted under 35 U.S.C. 154(b) by 246 days.

(21) Appl. No.: 18/468,850

(22) Filed: Sep. 18, 2023

(65) Prior Publication Data

US 2024/0002270 A1    Jan. 4, 2024

Related U.S. Application Data

(62) Division of application No. 15/939,620, filed on Mar. 29, 2018, now Pat. No. 11,795,093.

(51) Int. Cl.
C03B 9/03         (2006.01)
C03B 7/00         (2006.01)
(Continued)

(52) U.S. Cl.
CPC ................. C03B 9/38 (2013.01); C03B 7/005 (2013.01); C03B 9/40 (2013.01); C03B 9/41 (2013.01)

(58) Field of Classification Search
None
See application file for complete search history.

(56) References Cited

U.S. PATENT DOCUMENTS 2,915,638 A * 12/1959 Poole ......................... C03B 9/30
                                                                 65/158
3,860,407 A * 1/1975 Fertik ................... C03B 9/3816
                                                                 65/29.17
(Continued)

FOREIGN PATENT DOCUMENTS

DE        102004048721 A1 * 4/2006 ............. C03B 7/005

OTHER PUBLICATIONS

"Avenger and Summer Circuits" downloaded from https://www.allaboutcircuits.com/textbook/semiconductors/chpt-8/averager-summer-circuits/ on Jan. 11, 2021, pp. 1-3.
(Continued)

*Primary Examiner* — Jodi C Franklin
(74) *Attorney, Agent, or Firm* — Reinhart Boerner Van Deuren P.C.

(57) ABSTRACT

Methods and systems for controlling vertical glass distribution are provided. A traversing pyrometer periodically measures a parison actual temperature after the parisons exit a blank mold. The thermal camera takes a thermal image of each glass container after the glass container exits the blow mold. A vertical glass signature extraction module extracts a vertical glass distribution signature. A parison temperature estimator determines a parison estimated temperature for each vertical glass distribution signature obtained based on the vertical glass distribution signature, a most recently measured parison actual temperature and a parison stretch time. A parison temperature summer compares the parison estimated temperature to a parison set point temperature to determine a parison temperature error. A parison temperature control controls a blank mold contact time based on the parison temperature error.

22 Claims, 3 Drawing Sheets

(51) Int. Cl.
　　*C03B 9/38*　　　　(2006.01)
　　*C03B 9/40*　　　　(2006.01)
　　*C03B 9/41*　　　　(2006.01)

(56)　　　　　References Cited

U.S. PATENT DOCUMENTS

| | | | | |
|---|---|---|---|---|
| 3,953,188 | A * | 4/1976 | Fertik | C03B 9/3816 |
| | | | | 65/161 |
| 4,368,062 | A * | 1/1983 | Mapes | C03B 9/3816 |
| | | | | 700/158 |
| 4,615,723 | A * | 10/1986 | Rodriguez-Fernandez | |
| | | | | G05B 19/0421 |
| | | | | 65/159 |
| 4,812,156 | A | 3/1989 | Virey et al. | |
| 5,726,878 | A * | 3/1998 | Nakamura | G05B 13/026 |
| | | | | 700/44 |
| 6,604,383 | B2 * | 8/2003 | Simon | G05B 19/0426 |
| | | | | 65/159 |
| 6,810,690 | B2 * | 11/2004 | Fenton | C03B 9/165 |
| | | | | 65/161 |
| 6,951,629 | B2 | 10/2005 | Kronseder | |
| 8,857,213 | B2 * | 10/2014 | Simon | G05B 19/042 |
| | | | | 65/29.1 |
| 9,523,980 | B2 * | 12/2016 | Simon | G05B 19/042 |
| 9,580,345 | B2 * | 2/2017 | Simon | C03B 9/3816 |
| 9,785,132 | B2 * | 10/2017 | Simon | G06T 7/001 |
| 10,773,989 | B2 * | 9/2020 | Gaylo | G01N 25/00 |
| 11,795,093 | B2 * | 10/2023 | Simon | C03B 9/40 |
| 2002/0134817 | A1 * | 9/2002 | Shepard | G01N 25/72 |
| | | | | 228/105 |
| 2002/0194871 | A1 | 12/2002 | Simon | |
| 2003/0171889 | A1 * | 9/2003 | Shelby | B29C 49/6454 |
| | | | | 702/130 |
| 2004/0194506 | A1 * | 10/2004 | Ueda | C03B 7/005 |
| | | | | 65/29.14 |
| 2011/0024953 | A1 * | 2/2011 | Winzinger | B29C 49/12 |
| | | | | 425/526 |
| 2011/0141264 | A1 | 6/2011 | Holtkamp et al. | |
| 2011/0141265 | A1 * | 6/2011 | Holtkamp | G01N 33/386 |
| | | | | 348/86 |
| 2012/0007289 | A1 * | 1/2012 | O'Connell | B29C 49/0411 |
| | | | | 264/406 |
| 2012/0174628 | A1 * | 7/2012 | Simon | G05B 19/41875 |
| | | | | 65/162 |
| 2012/0226378 | A1 * | 9/2012 | Simon | C03B 9/41 |
| | | | | 700/157 |
| 2012/0261850 | A1 * | 10/2012 | Simon | C03B 9/41 |
| | | | | 264/40.6 |
| 2014/0178655 | A1 | 6/2014 | Kronseder | |
| 2015/0076353 | A1 * | 3/2015 | Bathelet | G01B 11/06 |
| | | | | 250/340 |
| 2015/0142163 | A1 * | 5/2015 | Simon | G01N 21/90 |
| | | | | 700/158 |
| 2015/0284115 | A1 | 10/2015 | Voth et al. | |
| 2016/0052817 | A1 * | 2/2016 | Ueda | C03B 9/1932 |
| | | | | 65/319 |
| 2016/0257594 | A1 * | 9/2016 | Johnston | G01P 3/36 |
| 2017/0197860 | A1 * | 7/2017 | Vorspel | C03B 9/13 |
| 2018/0105447 | A1 * | 4/2018 | Graff | C03B 9/1932 |
| 2018/0362383 | A1 * | 12/2018 | Tijerina Ramos | C03B 9/3883 |
| 2019/0337218 | A1 * | 11/2019 | Kawamura | B29C 45/7207 |
| 2020/0055763 | A1 * | 2/2020 | Ding | C03B 9/41 |
| 2020/0156982 | A1 * | 5/2020 | Thacker | C03B 9/3891 |
| 2020/0299169 | A1 * | 9/2020 | Cosneau | C03B 9/41 |
| 2021/0107821 | A1 * | 4/2021 | Brown | C03B 40/02 |

OTHER PUBLICATIONS

"Stirling, A Book on Steam for Engineers" 1905, Printed by Rosenow Company, Chicago p. 50.

* cited by examiner

MULTIVARIABLE VERTICAL GLASS DISTRIBUTION CONTROL USING SOFT SENSOR AND METHODS

CROSS-REFERENCE TO RELATED PATENT APPLICATIONS

This patent application is a divisional of co-pending U.S. patent application Ser. No. 15/939,620, filed Mar. 29, 2018, the entire teachings and disclosure of which are incorporated herein by reference thereto.

FIELD OF THE INVENTION

This invention generally relates to I.S. (individual section) machines for manufacturing glass containers, and specifically, to systems and methods for controlling vertical glass distribution of the glass containers.

BACKGROUND OF THE INVENTION

Various systems relate to monitoring and controlling glass container production to improve process yield and quality while reducing dependence on operator skill by automatically adjusting I.S. machine control to maintain desired vertical glass distribution.

A system and method for controlling an I.S. machine to control for vertical glass distribution is disclosed in U.S. Pat. No. 8,857,213, filed Jan. 10, 2012, entitled "Vertical Glass Distribution Habituating Control System and Method" which is assigned to the assignee of the present patent application, and which is hereby incorporated herein by reference in their entirety. While this system does a good job controlling vertical glass distribution, improvements in the system are always desired.

The present invention provides improvements over the current state of the art for controlling a glass container forming I.S. machine to provide consistent vertical glass distribution.

BRIEF SUMMARY OF THE INVENTION

Embodiments of the present invention provide new and improved systems and methods for controlling vertical glass distribution in a glass container forming machine.

In a particular embodiment, a system for controlling vertical glass distribution in glass containers formed from an individual section machine is provided. The individual section machine includes a blank mold for forming a stream of parisons from a stream of gobs of glass, a blow mold for forming a stream of glass containers from the stream of parisons, a traversing pyrometer that measures a parison actual temperature of the parisons after the parisons exit the blank mold, the traversing pyrometer measuring the parison actual temperature periodically such that the parison actual temperature of less than all of the parisons that exit the blank mold is measured, and a thermal camera that takes a thermal image of each glass container after the glass container exits the blow mold. The system includes a vertical glass signature extraction module that extracts a vertical glass distribution signature indicative of actual vertical glass distribution of each glass container from the thermal image of each glass container. The system includes a parison temperature estimator configured to determine a parison estimated temperature for each vertical glass distribution signature obtained based on the vertical glass distribution signature, a most recently measured parison actual temperature and a parison stretch time, the parison stretch time being the amount of time each parison is permitted to stretch prior to being formed into a glass container. The system includes a parison temperature summer that compares the parison estimated temperature to a parison set point temperature to determine a parison temperature error. The system includes a parison temperature control that controls a blank mold contact time based on the parison temperature error. The blank mold contact time is an amount of time each parison remains in contact with the blank mold.

In some embodiments, the traversing pyrometer only periodically measures the parison actual temperature because the traversing pyrometer is used to measure temperature information for a plurality of the different individual sections. As such, the pyrometer can only measure the temperature information for the individual section for which it is currently proximate. Typically, the traversing pyrometer follows a closed track that allows the pyrometer to repeatedly travel between the various individual sections.

In one embodiment, the individual section machine includes a blank mold cooling system cooling the blank mold with a cooling fluid. The system further includes a blank mold contact time summer that compares the blank mold contact time from the parison temperature control to a blank mold contact time set point to determine a blank mold contact time error. The system includes a blank mold contact time midrange control configured to generate a calculated blank mold cooling signal used, at least in part, as a basis for generating a control signal for controlling the blank mold cooling system to control cooling of the blank mold. The blank mold contact time midrange control generates the calculated blank mold cooling signal based on the blank mold contact time error.

In one embodiment, the calculated blank mold cooling signal is a calculated blank mold cooling time based on the blank mold contact time error.

In one embodiment, the system includes a blank mold cooling time limiting control. The blank mold cooling time limiting control generating a master blank mold cooling time used, at least in part, as a basis for generating the control signal to control the blank mold cooling system. The blank mold cooling time limiting control generates a master blank mold cooling time that is 1) the calculated blank mold cooling time if the calculated blank mold cooling time is between a maximum blank mold cooling time and a minimum blank mold cooling time; 2) the maximum blank mold cooling time if the calculated blank mold cooling time is greater than the maximum blank mold cooling time; or 3) the minimum blank mold cooling time if the calculated blank mold cooling time is less than the maximum blank mold cooling time.

In one embodiment, the blank mold cooling time limiting control is a blank mold cooling time override control. The blank mold cooling time override control adjusts at least one of the maximum blank mold cooling time and the minimum blank mold cooling time periodically based on a blank mold actual temperature.

In one embodiment, the blank mold actual temperature is measured by the traversing pyrometer. The traversing pyrometer measures the blank mold actual temperature periodically such that the blank mold actual temperature is not measured each time the blank mold produces a parison.

In one embodiment, the blank mold includes a plurality of blank mold portions including a first blank mold portion and a second blank mold portion. The first and second blank mold portions form at least part of at least one blank mold cavity formed by the blank mold. The blank mold cooling system cooling the first blank mold portion and the second blank mold portion with the cooling fluid. The blank mold cooling system cooling the first blank mold portion based on a first blank mold portion cooling time and the second blank mold portion based on a second blank mold portion cooling time. The system further includes a blank mold cooling time bias summer that adds a blank mold portion cooling time bias value to the master blank mold cooling time to generate the first blank mold portion cooling time and the second blank mold portion cooling time.

In one embodiment, the system includes a blank mold bias module that receives a first blank mold portion actual temperature value and a second blank mold portion actual temperature value and compares the first and second blank mold portion actual temperature values to determine a first and second blank mold portion actual temperature bias value. The system includes a blank mold portion bias summer that compares the first and second blank mold portion actual temperature bias value to a first and second blank mold portion temperature bias set point to determine a first and second blank mold portion temperature bias error. The first and second blank mold portion temperature bias set point is a desired temperature difference between the first and second blank mold portions. The system includes a blank mold portion temperature control that generates the blank mold portion cooling time bias value based on the first and second blank mold portion temperature bias error.

In one embodiment, the blank mold portion cooling time bias value is an array of blank mold portion bias values. Typically, one of the bias values is associated with each of the various blank mold portions. These bias values may be based off of a baseline value for one of the blank mold portions. Typically, this is one of the calculated blank mold cooling times outlined above.

In one embodiment, the first and second blank mold portions form a first pair of blank mold portions forming at least part of a first blank mold cavity. The plurality of blank mold portions includes a second pair of blank mold portions including a third blank mold portion and a fourth blank mold portion. The third and fourth blank mold portions forming at least part of a second blank mold cavity formed by the blank mold. The first blank mold portion and the third blank mold portion are formed by a first blank mold half of the first blank mold. The second blank mold portion and the fourth blank mold portion are formed by a second blank mold half. The blank mold cooling system cools the third blank mold portion and the fourth blank mold portion with the cooling fluid. The blank mold cooling system cools the third blank mold portion based on a third blank mold portion cooling time and the fourth blank mold portion based on a fourth blank mold portion cooling time. The blank mold portion cooling time bias values are generated based on a cavity-to-cavity component that is a bias value between the first and second blank mold cavities and a mold half-to-mold half component that is a bias value between the pair of blank mold portions used to form a corresponding blank mold cavity.

In one embodiment, the system further includes a vertical glass distribution signature summer that compares the vertical glass distribution signature from the vertical glass signature extraction module to a vertical glass distribution signature set point to determine a vertical glass distribution signature error. The system includes a parison stretch time control that controls the parison stretch time based on the vertical glass distribution signature error.

In another embodiment, a system for forming glass containers is provided. The system includes the blank mold, the blow mold, the traversing pyrometer, the thermal camera and one of the systems for controlling vertical glass distribution in glass containers outlined above.

In another embodiment, a method of controlling the vertical glass distribution in a stream of glass containers exiting a blow mold is provided. The blow mold receives a stream of parisons from a blank mold that forms the parisons from a stream of gobs of glass. The method includes measuring a parison actual temperature of the parisons after the parisons exit the blank mold. Measuring a parison actual temperature occurs periodically such that less than all of the parisons that exit the blank mold are measured. The method includes taking a thermal image of each glass container after the glass container exits the blow mold. The method includes extracting a vertical glass distribution signature indicative of actual vertical glass distribution of each glass container from the thermal image of each glass container. The method includes estimating a parison estimated temperature for each vertical glass distribution signature that has been extracted based on the vertical glass distribution signature, a most recently measured parison actual temperature and a parison stretch time, the parison stretch time being the amount of time each parison is permitted to stretch prior to being formed into a glass container. The method includes comparing the parison estimated temperature to a parison set point temperature to determine a parison temperature error. The method includes controlling a blank mold contact time based on the parison temperature error. The blank mold contact time is an amount of time each parison remains in contact with the blank mold.

In one embodiment, the method further includes comparing the blank mold contact time to a blank mold contact time set point to determine a blank mold contact time error. The method includes generating a calculated blank mold cooling signal. The method includes generating a control signal for controlling a blank mold cooling system, based at least in part on the calculated blank mold cooling signal. The calculated blank mold cooling signal is based on the blank mold contact time error.

In one embodiment, the calculated blank mold cooling signal is a calculated blank mold cooling time.

In one embodiment, the method further includes generating a master blank mold cooling time used, at least in part, as a basis for generating the control signal to control the blank mold cooling system. The master blank mold cooling time is: 1) the calculated blank mold cooling time if the calculated blank mold cooling time is between a maximum blank mold cooling time and a minimum blank mold cooling time; 2) the maximum blank mold cooling time if the calculated blank mold cooling time is greater than the maximum blank mold cooling time; or 3) the minimum blank mold cooling time if the calculated blank mold cooling time is less than the maximum blank mold cooling time.

In one embodiment, the method includes sensing a blank mold actual temperature. The method includes adjusting at least one of the maximum blank mold cooling time and the minimum blank mold cooling time periodically based on the blank mold actual temperature.

In one embodiment, the blank mold actual temperature is measured periodically such that the blank mold actual temperature is not measured each time the blank mold produces a parison.

In one embodiment, the blank mold includes a plurality of blank mold portions including a first blank mold portion and a second blank mold portion. The first and second blank mold portions forming at least part of at least one blank mold cavity formed by the blank mold. The method further includes generating a first blank mold portion cooling time for controlling the blank mold cooling system to cool the first blank mold portion and a second blank mold portion cooling time for controlling the blank mold cooling system to cool the second blank mold portion by adding a blank mold portion cooling time bias value to the master blank mold cooling time.

In one embodiment, the method includes receiving a first blank mold portion actual temperature value and a second blank mold portion actual temperature value. The method includes comparing the first and second blank mold portion actual temperature values to determine a first and second blank mold portion actual temperature bias value. The method includes comparing the first and second blank mold portion actual temperature bias value to a first and second blank mold portion temperature bias set point to determine a first and second blank mold portion temperature bias error. The first and second blank mold portion temperature bias set point is a desired temperature difference between the first and second blank mold portions. The method includes generating the blank mold portion cooling time bias value based on the first and second blank mold portion temperature bias error.

In one embodiment, the blank mold portion cooling time bias value includes generating an array of blank mold portion bias values.

In one embodiment, the first and second blank mold portions form a first pair of blank mold portions forming at least part of a first blank mold cavity. The plurality of blank mold portions includes a second pair of blank mold portions including a third blank mold portion and a fourth blank mold portion. The third and fourth blank mold portions form at least part of a second blank mold cavity formed by the blank mold. The first blank mold portion and the third blank mold portion are formed by a first blank mold half of the first blank mold. The second blank mold portion and the fourth blank mold portion are formed by a second blank mold half. The blank mold cooling system cools the third blank mold portion and the fourth blank mold portion with the cooling fluid. The blank mold cooling system cools the third blank mold portion based on a third blank mold portion cooling time and the fourth blank mold portion based on a fourth blank mold portion cooling time. The blank mold portion cooling time bias values are generated based on a cavity-to-cavity component that is a bias value between the first and second blank mold cavities and a mold half-to-mold half component that is a bias value between the pair of blank mold portions used to form a corresponding blank mold cavity.

In one embodiment, the method includes comparing the vertical glass distribution signature from the vertical glass signature extraction module to a vertical glass distribution signature set point to determine a vertical glass distribution signature error. The method includes controlling the parison stretch time based on the vertical glass distribution signature error.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
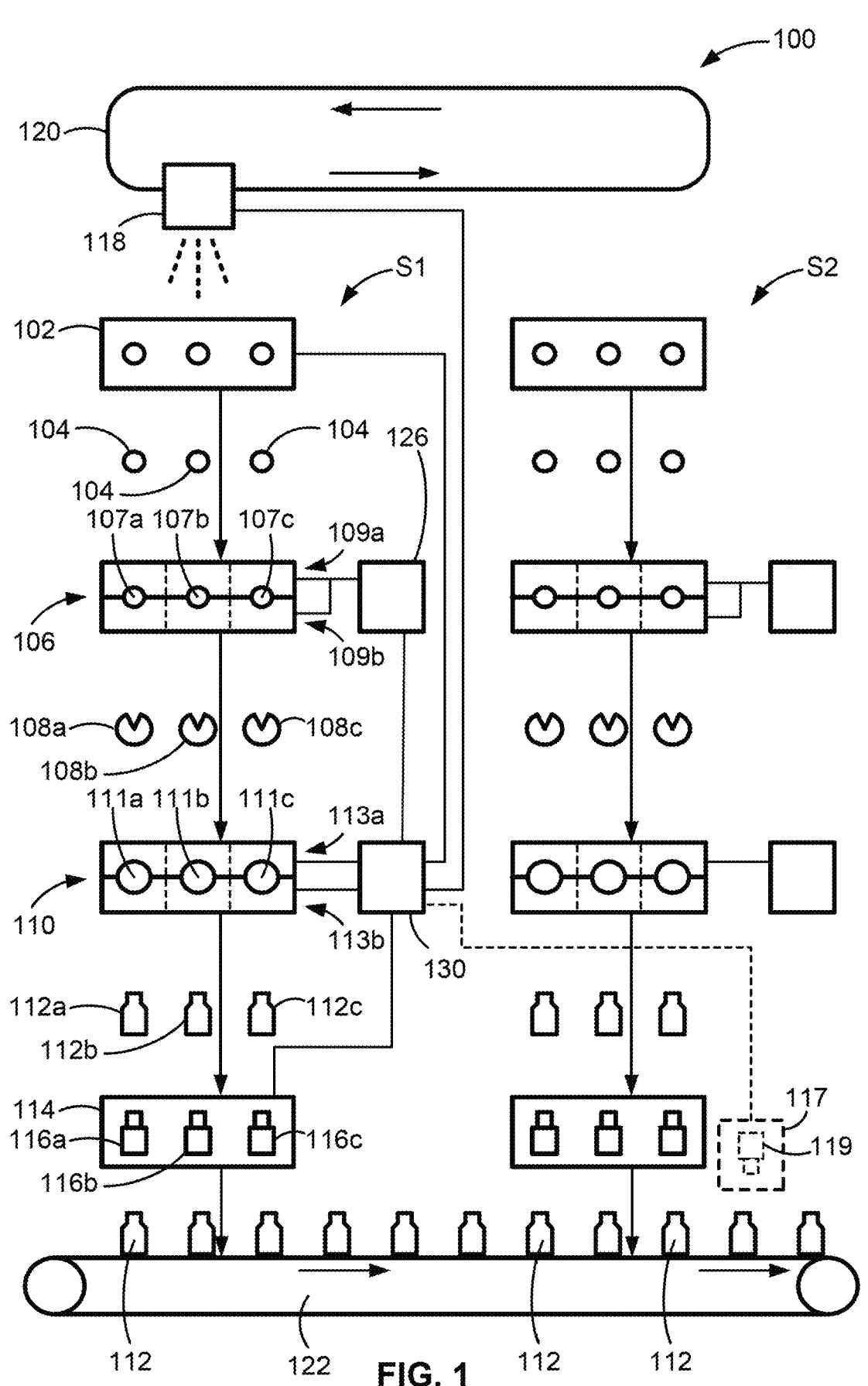
FIG. 1 is a schematic illustration of a glass container forming machine in the form of an independent section machine.

FIG. 1 is a schematic illustration of a glass container forming machine 100 that illustrates two independent sections S1 and S2. While only two independent sections S1 and S2 are illustrated, the glass container forming machine 100 could have many more independent sections such as S1, S2 . . . SN. Further, while the glass container forming machine 100 includes a plurality of independent sections S1 and S2, features of the glass container forming machine could be implemented in systems that do not have independent sections.

Each independent section S1 and S2 are substantially similar and thus only independent section S1 will be described. Any potential distinctions between S1 and S2 may be described separately.

Independent section S1 includes a glass gob forming and feeding arrangement 102 that forms and feeds a stream of molten gobs 104 to a first mold that defines a first set of mold cavities, illustrated in the form of blank mold 106 having blank mold cavities 107A-107C (referred to generically by reference character 107). The blank mold 106 includes first and second blank mold halves 109A and 109B (referred to generically by reference character 109) that come together to form, at least in part, the blank mold cavities 107A-107C. While three blank mold cavities 107A-107C are illustrated, the blank mold 106 could have more or fewer blank mold cavities 107.

Further, each portion of the blank mold (also referred to herein as a "blank mold portion") that forms a portion (typically about half) of a blank mold cavity 107A-107C, in some embodiments, may have its own characteristics such as temperature (e.g., cooling). The blank mold 106 includes vertical dashed lines between adjacent blank mold cavities 107A-107C to help illustrate the separate blank mold portions. In some embodiments, each blank mold portion may be in the form of a blank mold cavity half. However, in most embodiments, no such special demarcation between the different portions is necessary. In the illustrated embodiment, the blank mold 106 would have six such blank mold portions (two portions for each cavity in the blank mold 106). However, other embodiments could have more or less blank mold portions. Typically, this number is driven by the number of blank mold cavities 107A-107C. The blank mold portions may be viewed as a pair of blank mold portions. The pair of blank mold portions would consist of the two portions that form a corresponding one of the blank mold cavities 107A, 107B, 107C. One of the blank mold portions would be provided by blank mold half 109A and the other blank mold portion of the pair would be provided by the other blank mold half 109B.

The blank mold cavities 107A-107C open and close simultaneously in this embodiment. In some embodiments, the blank mold 106 may be configured such that each blank mold cavity 107A-107C can be independently opened from the other cavities. This would be similar to providing one blank mold for each cavity. the blank molds 106 may be controlled to open and close as a group, e.g., all blank molds 106 of the independent section S1 open and close simultaneously, or independently, e.g., at individual times for each of the individual blank molds 106.

Pre-containers or parisons 108A-108C (referred to generically as parisons 108) are formed in the blank mold cavities 107A-107C by pressing or blowing depending on the process type (press-blow or blow-blow) to form a stream of parisons 108. The parisons 108 formed from blank molds 106 are transferred to a second mold that includes a second set of mold cavities, illustrated in the form of blow mold 110 and blow mold cavities 111A-111C (referred to generically as blow mold cavities 111). Similar to the blank mold 106, the blow mold 110 is formed from a plurality of portions illustrated in the form of first and second blow mold halves 113A-113B that form at least in part the blow mold cavities 111A-111C. The parisons 108 are blown into the final shape of the glass containers 112A-112C (referred to generically as glass containers 112) in the blow mold 110. The glass containers 112 exiting the blow mold 110 form a stream of glass containers 112. Similar to the blank mold 106, the blow mold 110 may be controlled to open and close the cavities 111A-111C as a group, e.g., all blow mold cavities 111A-111C of the independent section S1 open and close simultaneously, or independently, e.g., at individual times for each of the individual blow mold cavities 111A-111C.

Thereafter, the glass containers 112 are analyzed and monitored by a glass distribution measurement system 114 to analyze the glass containers 112 to determine if the glass thereof is properly distributed. The glass distribution measurement system 114 includes one or more thermal imaging cameras that captures a thermal image 116A-116C (referred to generically as thermal images 116) of each of the glass containers 112 after the glass containers 112 exit the blow molds 110.

In FIG. 1, a glass distribution measurement system is illustrated for each of the independent sections S1, S2. However, an alternative arrangement is also illustrated in FIG. 1 in dashed lines. In an alternative arrangement, a single glass distribution measurement system 117 is provided that is downstream from all of the independent sections S1, S2 . . . SN. As such, a single glass distribution measurement system 117 is used for all of the glass containers 112 that are formed from the plurality of independent sections S1, S2 . . . SN. As such, only a single camera 119 (or single camera setup if multiple cameras are used to determine glass distribution, for purposes of this application the term "camera" may have one or more actual cameras in practice). If such a single camera system is used, the system would be synchronized such that it would know which thermal image for each glass container 112 corresponds to which blank mold 106 and more particularly which blank mold cavity 107A-107C.

In addition to the thermal images 116 captured by the glass distribution measurement system 114, a traversing pyrometer 118 captures actual temperature information of various components of the glass container forming machine 100 (e.g. blank mold actual temperatures of the blank molds

106, which may be a single actual temperature value for each blank mold 106 or actual temperature information for each of the blank mold halves or even more particularly actual temperature information for each portion of the blank mold 106 (e.g. six temperature values in the illustrated embodiment, depending on the system) as well as products of glass formed during the various steps in the container forming process (e.g. parison actual temperature of the parisons 108 after the parisons 108 exit the blank molds 106). Other temperature information may be gathered by the traversing pyrometer 118. However, only the temperature information relevant to the instant embodiments will be described.

The traversing pyrometer 118 is shared by and travels between the various independent sections S1, S2 . . . SN. In the illustrated embodiment, the traversing pyrometer 118 travels on a track 120 that carries the traversing pyrometer 118 between the different independent sections S1, S2 . . . SN. Due to the size of the glass container forming machine 100 and the time it takes to make a complete trip along track 120 relative to the time each of the individual processes that take place between gob to container, the parison actual temperature and blank mold (or blank mold half or blank mold portion) actual temperatures captured by the traversing pyrometer 118 are only captured periodically and do not get captured for each and every cycle when the blank molds 106 form parisons 108. This is unlike the glass distribution measurement system 114 where a thermal image 116 of each and every glass container 112 is taken and then can be analyzed.

The glass containers 112 are carried away by a container transport system, illustrated in the form of a conveyor 122. Any glass containers 112 that do not pass various quality control tests are also discarded and typically destroyed. For example, the failed glass container 112 may be automatically removed from conveyor 122.

To control the temperature of the parisons 108, the temperature of the blank mold 106, and in more detailed embodiments the individual blank mold portions, and time the parisons 108 remain in the blank mold cavities 107A-107C are controlled. To control the temperature of the blank mold 106 (e.g., blank mold portions), a blank mold cooling system 126 uses a cooling fluid to cool the blank mold 106. In some systems, the blank mold cooling system 126 can control, at least to some extent, the amount of cooling for each of the blank mold halves 109A, 109B and even more particularly each of the blank mold portions (e.g., the six blank mold portions identified above). In some embodiments, the individual control may take the form of different cooling times for different blank mold portions. This can be done by separately controlling valving of the blank mold cooling system 126 that controls the flow of cooling fluid to each of the different blank mold portions. This could be done by controlling the amount of time that individual valves are open.

A control system 130, illustrated generically in FIG. 1 can be operably coupled to various ones of the components of the glass container forming machine 100 to control the operation of those components. The control system 130 is illustrated in simplified form as a single block in FIG. 1. However, the control system 130 may include a plurality of different controllers for controlling the various different components of the glass container forming machine 100. Further, the control system 130 may be dedicated to an independent section S1, S2 or a single control system may control multiple or even all of the independent sections within the glass container forming machine 100.

Figure 2A:
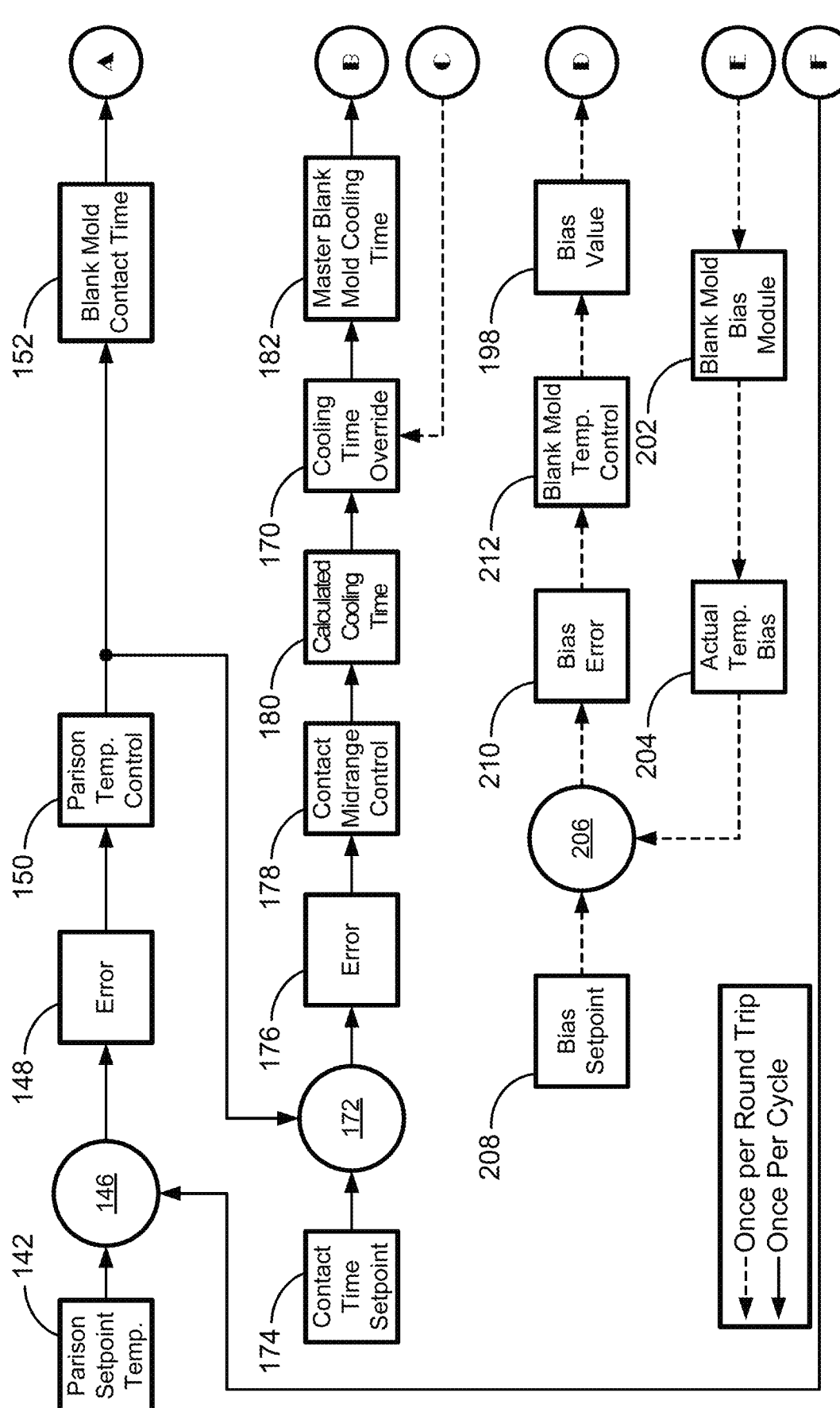
FIGS. 2A and 2B (referred to generically as FIG. 2 throughout) is a schematic illustration of a vertical glass distribution control system used in the glass container forming machine to control consistency of vertical glass distribution of glass containers formed using the glass container forming machine.
Figure 2B:
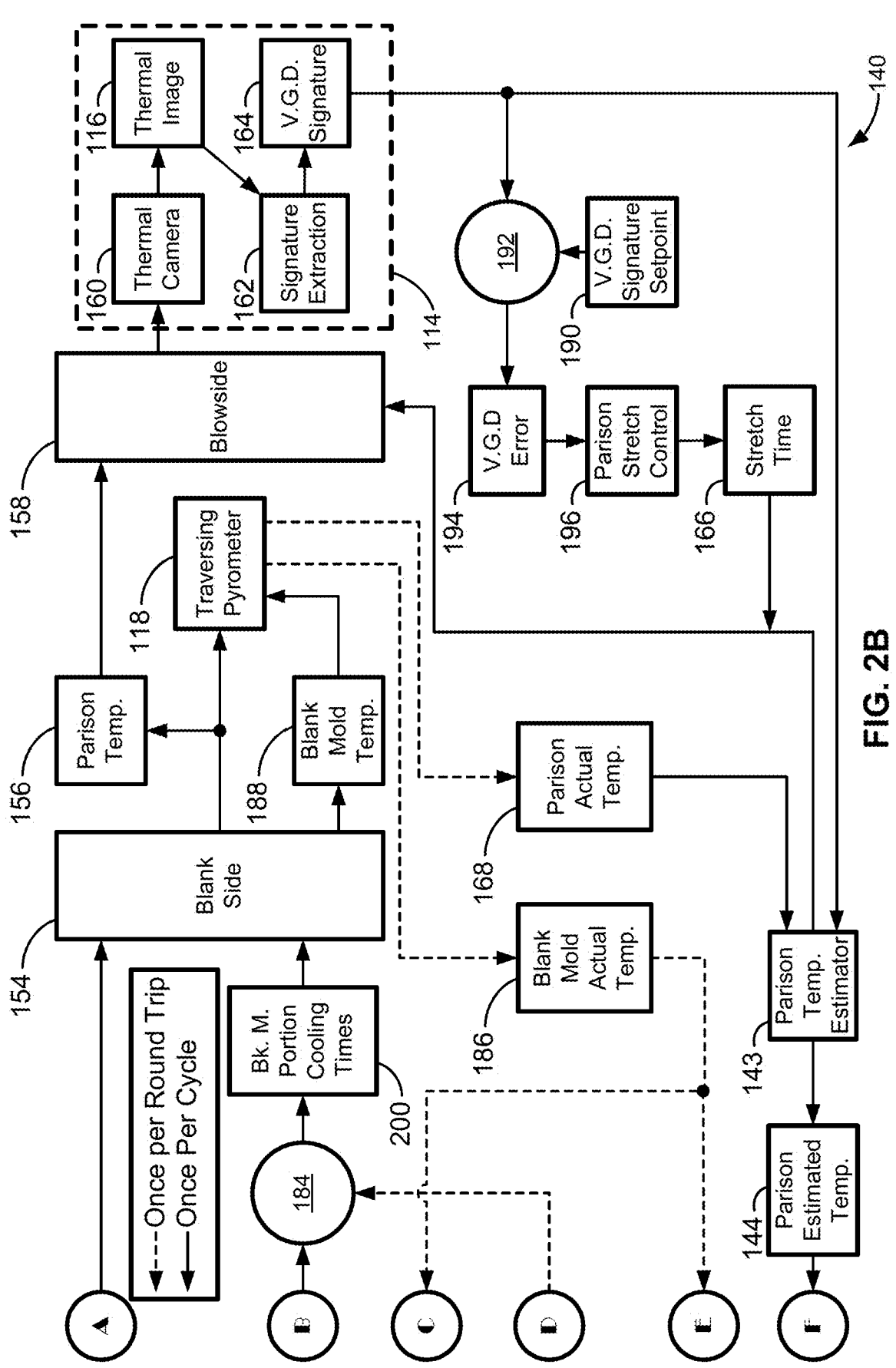

A schematic illustration of a vertical glass distribution control system 140 of the glass container forming machine 100 of FIG. 1 is illustrated in FIG. 2. The vertical glass distribution control system 140 may include or utilize various ones of the components outlined above. The vertical glass distribution control system 140 is configured to attempt to maintain consistent vertical glass distribution for the stream of glass containers 112 formed from the independent sections S1, S2 . . . SN. Typically, the vertical glass distribution control system 140 will only focus on the components in and glass containers from a single one of the independent sections S1, S2 . . . SN.

Unfortunately, as noted above, the traversing pyrometer 118 does not capture actual temperature information for each and every cycle of the various components, e.g., the blank mold actual temperature (generically or for each mold half or blank mold portion) and the parison actual temperature. These values are only captured periodically and not every time a parison is created. The present vertical glass distribution control system compensates for this lack of complete parison actual temperature and blank mold actual temperature information by using a soft sensor multi-loop control structure.

The vertical glass distribution control system 140 has various different feedback control loops for operably controlling various components of the glass container forming machine 100 to attempt to maintain consistent glass distribution and particularly vertical glass distribution.

In a first feedback loop, the parison temperature is controlled by adjusting a blank contact time, which is the amount of time each parison 108 remains in contact with the corresponding blank mold 106. This contact time can be adjusted by adjusting the opening and closing of the blank mold 106, e.g., separation of the blank mold halves 109A, 109B.

A parison set point temperature 142 is compared with a parison estimated temperature 144. A parison temperature estimator 143, which may take the form of a soft sensor, uses a model to determine a parison estimated temperature for each glass container 112 that has formed. This parison estimated temperature is fed to a parison temperature summer 146 to determine a parison temperature error 148.

The parison temperature error 148 is fed to a parison temperature control 150 that uses the parison temperature error 148 to control a blank mold contact time 152. More particularly, for a given parison temperature error 148, the blank mold contact time 152 will be appropriately adjusted to attempt to drive the parison temperature error 148 to zero. Thus, if no parison temperature error 148 is determined by parison temperature summer 146 no change in the blank mold contact time 152 will occur. In some embodiments, the parison temperature control 150 is a proportional plus integral control. However, more sophisticated control could be provided.

The blank mold contact time 152 is used, at least in part, to control a portion of the blank mold process 154 to control the amount of time the parison 108 remains in contact with the blank mold 106, e.g., the open and closing time of the blank mold 106. Any adjustments to the blank mold contact time will typically adjust the parison temperature 156 of the parisons 108 as the parisons exit the blank molds 106. With all other things remaining unchanged, changes in the parison temperature 156 will change the resulting glass container 112 formed during the blow side process 158, including the vertical distribution of glass in the finished glass containers 112. The blow side process 158 is, among other things, where the parison 108 is blown to the final shape of the glass container 112 using the blow molds 110. Typically, increased parison temperature 156 will allow more glass to flow towards the bottom of a glass container 112 shifting the vertical glass distribution downward. Reduced parison temperature 156 will prevent glass from flowing towards the bottom of a glass container 112 resulting in more glass towards the top of the glass container 112 shifting the vertical glass distribution upward.

After the glass container 112 exits the blow mold 110, a thermal image 116 of each glass container 112 is captured using a thermal camera 160 of the glass distribution measurement system 114. The thermal image 116 is analyzed using a vertical glass signature extraction module 162 to extract a vertical glass distribution signature 164. The glass distribution signature 164 can be a scalar value that quantifies the vertical glass distribution or a change in the vertical glass distribution. The glass distribution signature 164 is fed, in this feedback loop, to the parison temperature estimator 143, to be used, in part, by the parison temperature estimator 143 to generate a new parison estimated temperature. As noted above, in an alternative embodiment, the thermal images of the glass container 112 may not be taken by dedicated cameras for each blow mold cavity, but by a single camera that is downstream from all of the individual sections S1, S2 . . . SN such as illustrated by glass distribution measurement system 117 illustrated as an optional configuration in FIG. 1.

In addition to the glass distribution signature 164, a parison stretch time 166 is also fed to and used by the parison temperature estimator 143 to generate the new parison estimated temperature. The parison stretch time 166 is the amount of time the parison 108 is allowed to stretch and/or reheat prior to performing the final blow that actually forms the shape of the final glass container 112 using the blow molds 110. Stretch time 166 can affect vertical glass distribution. More particularly, increased stretch time 166 prior to performing the blowing step can allow more glass in the parison 108 to flow vertically downward, which would be viewed, without actual knowledge of the value, as an increase in the parison temperature 156. Reduced stretch time 166 prior to performing the blowing step can prevent glass in the parison 108 from flowing vertically downward, which would be viewed, without actual knowledge of the value, as a decrease in the parison temperature 156.

Finally, to further generate the parison estimated temperature 144, the most recent, periodically gathered parison actual temperature 168 obtained from the traversing pyrometer 118 is used by the parison temperature estimator 143. The parison actual temperature 168 can be used to compensate for changes in the overall system 100, which can be manifested in the form of drifts in the relationship between the thermal images 116 and the parison temperature 156, which will affect the accuracy of the parison estimated temperature 144. For example, changes in the overall system 100 could cause fluctuations in the thermal images 116 which will then be thought by the system to be changes in the vertical glass distribution which would then erroneously create adjustments in the parison estimated temperature 144 resulting, ultimately, incorrect adjustments to the blank contact time 152.

The parison temperature estimator 143 uses the above identified information available to the system to provide quick cycle-by-cycle temperature estimates to the parison temperature control 150, which adjusts the blank contact time 152, achieving quick adjustments to the parison temperature 156 to result in quick adjustments to vertical glass distribution. The ultimate goal of this feedback loop is to drive the parison temperature error 148 to zero, and, thus, maintain constant vertical glass distribution.

A second, slower feedback loop provides mid-ranging control that controls blank mold cooling to ultimately adjust blank side process 154 which will ultimately feedback through blocks 158, 160, 116, 162, 164, 143, 144, 146, 148 and 150 to again, adjust blank contact time 152.

The second feedback loop will be described, in part, with optional features that can be eliminated in other embodiments or, at a minimum, simplified, while still providing some benefits of mid-ranging control. This second feedback loop is used to maintain the blank mold contact time 152, which is the manipulated variable from the first feedback loop discussed above, within a suitable, midrange, working level by gradually adjusting cooling of the blank mold cooling, e.g., by controlling the operation of blank mold cooling system 126, which forms part of the blank side process 154.

The second feedback loop includes a blank mold contact time summer 172 that compares the blank mold contact time 152 generated by the parison temperature control 150, the variable manipulated in the first feedback loop, to a blank mold contact time set point 174 to generate a blank mold contact time error 176.

The blank mold contact time error 176 is fed to a blank mold contact time midrange control 178 that attempts to drive this error 176 to zero. The blank mold contact time midrange control uses the blank mold contact time error 176 to adjust the blank mold cooling. In this particular embodiment, the cooling is adjusted by adjusting cooling time. The blank mold contact time midrange control 178 generates a calculated blank mold cooling time 180 that is used, at least in part, as a basis for generating a control signal for controlling the blank mold cooling system 126. The blank mold cooling time 180 is, at least in part, based on the blank mold contact time error 176. Other system specific variable such as type of glass, operating environment, size of the container, shape of the container, blank mold configurations and materials, etc. may also be used in conjunction with the blank mold contact time error 176 to generate the blank mold cooling time 180. In some embodiments, this blank mold cooling time 180 may be the actual control signal that is used by the blank mold cooling system 126 without further manipulation.

In the illustrated embodiment, this feedback loop includes an optional blank mold cooling time limiting control in the form of a blank mold cooling time override control 170, which maintains the blank mold cooling with an acceptable range between maximum and minimum limits. While an override control that allows for dynamically adjusting the maximum and minimum limits is illustrated, a simple fixed limit control could be used.

The blank mold cooling time override control 170 generates a master blank mold cooling time 182. The master blank mold cooling time 182 will be used, at least in part as the basis for generating the control signal that is fed to the blank side process 154, and particularly the blank mold cooling system 126 for controlling the blank mold cooling.

The master blank mold cooling time 182 generated by the blank mold cooling time override control 170 will be the calculated blank mold cooling time 180 if the calculated blank mold cooling time 180 is between a maximum blank mold cooling time and a minimum blank mold cooling time. The master blank mold cooling time 182 generated by the override control 170 will be the maximum blank mold cooling time if the calculated blank mold cooling time 180 is greater than the maximum blank mold cooling time. The master blank mold cooling time 182 generated by the override control 170 will be the minimum blank mold cooling time if the calculated blank mold cooling time 182 is less than the minimum blank mold cooling time.

In the illustrated embodiment, the blank mold actual temperature 186 is captured periodically by the traversing pyrometer 118 and fed to the blank mold cooling time override control 170. The blank mold actual temperature 186 is used by the blank mold cooling time override control 170 to dynamically adjust one or both of the maximum blank mold cooling time and the minimum blank mold cooling time periodically.

Again, adjustments to the master blank mold cooling time 182 will adjust, or be the basis for adjusting, the blankside process 154 and particularly cooling of the blank molds 106, which ultimately affects the blank mold temperature 188. The blank mold temperature 188, for a given blank mold contact time 152 will adjust the parison temperature 156 exiting the blank mold 106. Thus, if blank mold cooling is increased, more heat energy will be taken from the parison 108 resulting in lower parison temperatures 156. If blank mold cooling is decreased, less heat energy will be taken from the parison 108 resulting in higher parison temperatures. These changes in parison temperatures 156 will adjust the vertical glass distribution. These adjustments to vertical glass distribution will then cause an adjustment in the parison estimated temperature 144 being fed to parison temperature summer 146 causing a change in parison temperature error 148 and consequently an adjustment in the blank mold contact time 152.

The mid-ranging control loop cooperates with a further control loop related to temperature bias between one or more of the various blank mold portions. This additional control loop generates a blank mold portion cooling time bias value 198 that combines with the master blank mold cooling time 182 such that each of the blank mold portions has a specific blank mold portion cooling time. Here, the master blank mold cooling time 182 will be a mean cooling time for each blank mold 106 used as a basis for each blank mold portion cooling time. The biasing value will be added to the master blank mold cooling time 182 to generate the particular corresponding blank mold portion cooling time for each portion of the blank mold 106 that can have dedicated cooling times.

A blank mold cooling time bias summer 184 adds blank mold portion cooling time bias value or values 198 to the master blank mold cooling time 182 to generate blank mold portion specific blank mold portion cooling times for each of the blank mold portions. The specific blank mold portion cooling times are used to control cooling of the corresponding blank mold portions.

Typically, the bias value 198 will be an array of values, typically, one value for each of the independently controlled blank mold portions. It should be noted that in less sophisticated systems, a blank mold portion may be an entire blank mold half, such as blank mold half 109A or 109B. However, in a more desirable configuration, each blank mold portion is as identified above and relates to a portion of a blank mold half 109 that defines half of one of the blank mold cavities 107. Thus, as noted above, the illustrated system in FIG. 1 that has three blank mold cavities 107A-107B would have six blank mold portion cooling times generated.

It is contemplated that a blank mold portion bias value may be provided for each of the blank mold portions. In such an arrangement, a bias value of zero shall be considered a bias value. This is because it is contemplated that in some embodiments, one of the blank mold portions would have its blank mold portion cooling time set to the master blank mold cooling time and all other portions would be biased from that value. Thus, at least that baseline blank mold portion would have a bias value of zero.

It is contemplated that various different biases could be provided between various blank mold portions. For instance, one bias could between the blank mold portions that form a pair of blank mold portions that define a particular blank mold cavity 107. For instance, it could be desired to have the blank mold portion provided by the first blank mold half 109A for blank mold cavity 107A to be ten (10) degrees centigrade higher than the blank mold portion provided by the second blank mold half 109B for the blank mold cavity 107A. This will be referred to herein as "mold half-to-mold half" bias because it is a bias between blank mold portions of different mold halves used to form a single mold cavity.

Additionally, it is contemplated that blank mold portion temperature bias may exist between portions of a blank mold that form parts of different blank mold cavities. For instance, it may be desired to have the blank half portions that form blank mold cavity 107A at a different temperature than the blank half portions that form blank mold cavity 107B. For instance, it could be desired to have the blank mold portions forming blank mold cavity 107A ten (10) degrees centigrade warmer than the blank mold portions forming blank mold cavity 107B. This will be referred to herein as "cavity-to-cavity" bias because it is a bias between blank mold portions used to form different blank mold cavities.

It is contemplated that the blank mold portion cooling time bias value 198 could be based on any one of: the mold half-to-mold half bias, cavity-to-cavity bias or could have a combination of the two bias components.

The bias control loop is used to maintain desired temperature bias between various blank mold portions. To do this, the system includes a blank mold bias module 202 that receives the blank mold actual temperature 186 from the traversing pyrometer 118. In this instance, the blank mold actual temperature 186 includes the blank mold portion actual temperatures of all of the blank mold portions. The blank mold bias module 202 compares the blank mold portion actual temperatures to determine a blank mold half actual temperature bias value 204 (e.g. a difference in actual temperature between the various blank mold halves relative to a baseline temperature value, which will typically be one of the selected blank mold portions but could be various other values such as an average of the desired temperatures of all blank mold portions, an average of the desired temperature the blank mold portions forming one of the blank mold cavities, an average of the desired temperature for the blank mold portions forming one of the blank mold halves 109, etc.).

A blank mold portion bias summer 206 compares the blank mold portion actual temperature bias values 204 to blank mold portion temperature bias set points 208 to determine blank mold portion temperature bias errors 210. The blank mold portion temperature bias set points 208 are a predetermined desired temperature difference between the blank mold portions relative to the baseline temperature value. These setpoint values are user manipulated values.

A blank mold portion temperature control 212 controls the blank mold portion cooling time bias value(s) 198 based on the blank mold portion temperature bias errors 210. More particularly, the blank mold portion temperature control 212 uses characteristics specific to the particular blank mold cooling system 126 and the blank mold 106 and blank mold portions to determine updates to the blank mold portion cooling time bias values 198 so as to progress towards having the desired (e.g., set point) blank mold portion temperature bias set points 208.

In one embodiment, the blank mold portion temperature control 212 is a standard proportional plus integral controller. One controller may be dedicated to each blank mold 106, each blank mold half 109A, 109B or each blank mold portion may have a dedicated controller.

These blank mold portion cooling time bias value(s) 198 are added to the master blank mold cooling time 182 at blank mold cooling time bias summer 184 to generate the blank mold portion cooling times 200. These blank mold portion cooling times 200 are fed to the blank side process 154, e.g., the cooling system 126, which will adjust the cooling of the blank mold portions to adjust the temperature of the blank mold portions. The actual temperature values of the blank mold portions will be periodically captured by the traversing pyrometer 118. These actual temperature values will again be processed by blank mold bias module 202 and fed back to summer 206 to complete the loop. Ultimately, the goal of this loop is to drive the blank mold portion temperature bias error 210 to zero.

While this loop was described in combination with a loop that includes the blank mold cooling time override control 170. The bias control could be implemented in those systems where the blank mold cooling time override control 170 is not present. In such a situation, the bias values would be added to the calculated blank mold cooling time to generate the individual blank mold portion cooling times 200.

A further control loop provides thermal signature control to allow the user to adjust a vertical glass distribution signature. This signature could be a center of intensity value or a more detailed desired thermal distribution (e.g., thermal bands representing various different intensity values for different vertical bands, thermal sections that represent various different intensity values for different portions of the container both vertically and horizontally). Examples of such thermal signature analysis and control is provided in U.S. Pat. No. 9,785,132 to Simon entitled "Target Signature Closed Loop Control System and Method," assigned to the assignee of the instant application and incorporated herein in its entirety by reference thereto.

This control loop allows a user to set a vertical glass distribution signature set point 190 of a desired vertical glass distribution signature and then the system attempts to maintain that actual resulting vertical class distribution signatures captured by the thermal camera at the desired vertical glass distribution signature set point. A vertical glass distribution summer 192 compares the vertical glass distribution signature 164 from the vertical glass signature extraction module 162 to the vertical glass distribution signature set point 190 to determine a vertical glass distribution signature error 194.

The vertical glass distribution signature error 194 is used by a parison stretch time control 196 to control the parison stretch time 166. The parison stretch time 166 is used by the blowside process 158 to adjust the stretch of the parison 108, which will typically adjust the time prior to the final blow of the parison 108 within the blow mold 110. The changes in stretch time 166 will adjust the vertical glass distribution as discussed above and will adjust the thermal images 116, which will cause changes in the vertical glass distribution signature 164 determined by the vertical glass signature extraction module 162. This will ultimately be fed back to summer 192 completing the vertical glass distribution signature control loop.

As noted above, this parison stretch time 166 generated by the parison stretch time control 196 is used to determine the parison estimated temperature 144 per the first feedback loop.

Embodiments of the invention include performing the various steps performed by the vertical glass distribution control system 140 to determine and implement changes to the operating parameters of the various components of the system 100 outlined above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling vertical glass distribution in glass containers formed from an individual section machine, the individual section machine including:

a blank mold for forming a stream of parisons from a stream of gobs of glass, a blow mold for forming a stream of glass containers from the stream of parisons, a traversing pyrometer that measures a parison actual temperature of the parisons after the parisons exit the blank mold, the traversing pyrometer measuring the parison actual temperature periodically such that the parison actual temperature of less than all of the parisons that exit the blank mold is measured, and a thermal camera that takes a thermal image of each glass container after the glass container exits the blow mold, the system comprising:

a vertical glass signature extraction module that extracts a vertical glass distribution signature indicative of actual vertical glass distribution of each glass container from the thermal image of each glass container;

a parison temperature estimator configured to determine a parison estimated temperature for each vertical glass distribution signature obtained based on the vertical glass distribution signature, a most recently measured parison actual temperature and a parison stretch time, the parison stretch time being the amount of time each parison is permitted to stretch prior to being formed into a glass container;

a parison temperature summer that compares the parison estimated temperature to a parison set point temperature to determine a parison temperature error; and a parison temperature control that controls a blank mold contact time based on the parison temperature error, the blank mold contact time being an amount of time each parison remains in contact with the blank mold.

2. The system of claim 1, wherein the individual section machine includes a blank mold cooling system cooling the blank mold with a cooling fluid, the system further comprising:

a blank mold contact time summer that compares the blank mold contact time from the parison temperature control to a blank mold contact time set point to determine a blank mold contact time error;

a blank mold contact time midrange control configured to generate a calculated blank mold cooling signal used, as a basis for generating a control signal for controlling the blank mold cooling system to control cooling of the blank mold, the blank mold contact time midrange control generating the calculated blank mold cooling signal based on the blank mold contact time error.

3. The system of claim 2, wherein the calculated blank mold cooling signal is a calculated blank mold cooling time based on the blank mold contact time error.

4. The system of claim 3, further comprising:

a blank mold cooling time limiting control, the blank mold cooling time limiting control generating a master blank mold cooling time used, as a basis for generating the control signal to control the blank mold cooling system, the blank mold cooling time limiting control generating a master blank mold cooling time that is:

the calculated blank mold cooling time if the calculated blank mold cooling time is between a maximum blank mold cooling time and a minimum blank mold cooling time;

the maximum blank mold cooling time if the calculated blank mold cooling time is greater than the maximum blank mold cooling time; or the minimum blank mold cooling time if the calculated blank mold cooling time is less than the minimum blank mold cooling time.

5. The system of claim 4, wherein the blank mold cooling time limiting control is a blank mold cooling time override control, the blank mold cooling time override control adjusts at least one of the maximum blank mold cooling time and the minimum blank mold cooling time periodically based on a blank mold actual temperature.

6. The system of claim 5, wherein the blank mold actual temperature is measured by the traversing pyrometer, the traversing pyrometer measuring the blank mold actual temperature periodically such that the blank mold actual temperature is not measured each time the blank mold produces a parison.

7. The system of claim 4, wherein:
the blank mold includes a plurality of blank mold portions including a first blank mold portion and a second blank mold portion, the first and second blank mold portions forming at least part of at least one blank mold cavity formed by the blank mold;
the blank mold cooling system cooling the first blank mold portion and the second blank mold portion with the cooling fluid, the blank mold cooling system cooling the first blank mold portion based on a first blank mold portion cooling time and the second blank mold portion based on a second blank mold portion cooling time;
the system further comprising:
a blank mold cooling time bias summer that adds a blank mold portion cooling time bias value to the master blank mold cooling time to generate the first blank mold portion cooling time and the second blank mold portion cooling time.

8. The system of claim 7, further comprising:
a blank mold bias module that receives a first blank mold portion actual temperature value and a second blank mold portion actual temperature value and compares the first and second blank mold portion actual temperature values to determine a first and second blank mold portion actual temperature bias value;
a blank mold portion bias summer that compares the first and second blank mold portion actual temperature bias value to a first and second blank mold portion temperature bias set point to determine a first and second blank mold portion temperature bias error, the first and second blank mold portion temperature bias set point being a desired temperature difference between the first and second blank mold portions; and
a blank mold portion temperature control that generates the blank mold portion cooling time bias value based on the first and second blank mold portion temperature bias error.

9. The system of claim 8, wherein the blank mold portion cooling time bias value is an array of blank mold portion bias values.

10. The system of claim 9, wherein:
the first and second blank mold portions form a first pair of blank mold portions forming at least part of a first blank mold cavity;
the plurality of blank mold portions includes a second pair of blank mold portions including a third blank mold portion and a fourth blank mold portion, the third and fourth blank mold portions forming at least part of a second blank mold cavity formed by the blank mold;
the first blank mold portion and the third blank mold portion are formed by a first blank mold half of the first blank mold;
the second blank mold portion and the fourth blank mold portion are formed by a second blank mold half;
the blank mold cooling system cooling the third blank mold portion and the fourth blank mold portion with the cooling fluid, the blank mold cooling system cooling the third blank mold portion based on a third blank mold portion cooling time and the fourth blank mold portion based on a fourth blank mold portion cooling time; and
the blank mold portion cooling time bias values are generated based on a cavity-to-cavity component that is a bias value between the first and second blank mold cavities and a mold half-to-mold half component that is a bias value between the pair of blank mold portions used to form a corresponding blank mold cavity.

11. The system of claim 1, further comprising:
a vertical glass distribution signature summer that compares the vertical glass distribution signature from the vertical glass signature extraction module to a vertical glass distribution signature set point to determine a vertical glass distribution signature error; and
a parison stretch time control that controls the parison stretch time based on the vertical glass distribution signature error.

12. A system for forming glass containers comprising:
a blank mold for forming a stream of parisons from a stream of gobs of glass;
a blow mold for forming a stream of glass containers from the stream of parisons;
a traversing pyrometer that measures a parison actual temperature of the parisons after the parisons exit the blank mold, the traversing pyrometer measuring the parison actual temperature periodically such that the parison actual temperature of less than all of the parisons that exit the blank mold is measured;
a thermal camera that takes a thermal image of each glass container after the glass container exits the blow mold;
a system for controlling vertical glass distribution in glass containers according to claim 1.

13. The system of claim 12, further comprising: a blank mold cooling system cooling the blank mold with a cooling fluid;
wherein the system for controlling vertical glass distribution in glass containers further includes:
a blank mold contact time summer that compares the blank mold contact time from the parison temperature control to a blank mold contact time set point to determine a blank mold contact time error;
a blank mold contact time midrange control configured to generate a calculated blank mold cooling signal used as a basis for generating a control signal for controlling the blank mold cooling system to control cooling of the blank mold, the blank mold contact time midrange control generating the calculated blank mold cooling signal based on the blank mold contact time error.

14. The system of claim 13, wherein the calculated blank mold cooling signal is a calculated blank mold cooling time based on the blank mold contact time error.

15. The system of claim 14, further comprising:
a blank mold cooling time limiting control, the blank mold cooling time limiting control generating a master blank mold cooling time used as a basis for generating the control signal for controlling the blank mold cooling system, the blank mold cooling time limiting control generating a master blank mold cooling time that is:
the calculated blank mold cooling time if the calculated blank mold cooling time is between a maximum blank mold cooling time and a minimum blank mold cooling time;
the maximum blank mold cooling time if the calculated blank mold cooling time is greater than the maximum blank mold cooling time; or
the minimum blank mold cooling time if the calculated blank mold cooling time is less than the minimum blank mold cooling time.

16. The system of claim 15, wherein the blank mold cooling time limiting control is a blank mold cooling time override control, the blank mold cooling time override control adjusts at least one of the maximum blank mold cooling time and the minimum blank mold cooling time periodically based on a blank mold actual temperature.

17. The system of claim 16, wherein the blank mold actual temperature is measured by the traversing pyrometer, the traversing pyrometer measuring the blank mold actual temperature periodically such that the blank mold actual temperature is not measured each time the blank mold produces a parison.

18. The system of claim 15, wherein:

the blank mold includes a plurality of blank mold portions including a first blank mold portion and a second blank mold portion, the first and second blank mold portions forming at least part of at least one blank mold cavity formed by the blank mold;

the blank mold cooling system cooling the first blank mold portion and the second blank mold portion with the cooling fluid, the blank mold cooling system cooling the first blank mold portion based on a first blank mold portion cooling time and the second blank mold portion based on a second blank mold portion cooling time;

the system for controlling vertical glass distribution in glass containers further includes:

a blank mold cooling time bias summer that adds a blank mold portion cooling time bias value to the master blank mold cooling time to generate the first blank mold portion cooling time and the second blank mold portion cooling time.

19. The system of claim 18, wherein the system for controlling vertical glass distribution in glass containers further includes:

a blank mold bias module that receives a first blank mold portion actual temperature value and a second blank mold portion actual temperature value and compares the first and second blank mold portion actual temperature values to determine a first and second blank mold portion actual temperature bias value;

a blank mold portion bias summer that compares the first and second blank mold portion actual temperature bias value to a first and second blank mold portion temperature bias set point to determine a first and second blank mold portion temperature bias error, the first and second blank mold portion temperature bias set point being a desired temperature difference between the first and second blank mold portions; and a blank mold portion temperature control that generates the blank mold portion cooling time bias value based on the first and second blank mold portion temperature bias error.

20. The system of claim 19 wherein the blank mold portion cooling time bias value is an array of blank mold portion bias values.

21. The system of claim 20, wherein:

the first and second blank mold portions form a first pair of blank mold portions forming at least part of a first blank mold cavity;

the plurality of blank mold portions includes a second pair of blank mold portions including a third blank mold portion and a fourth blank mold portion, the third and fourth blank mold portions forming at least part of a second blank mold cavity formed by the blank mold;

the first blank mold portion and the third blank mold portion are formed by a first blank mold half of the first blank mold;

the second blank mold portion and the fourth blank mold portion are formed by a second blank mold half;

the blank mold cooling system cooling the third blank mold portion and the fourth blank mold portion with the cooling fluid, the blank mold cooling system cooling the third blank mold portion based on a third blank mold portion cooling time and the fourth blank mold portion based on a fourth blank mold portion cooling time; and the blank mold portion cooling time bias values are generated based on a cavity-to-cavity component that is a bias value between the first and second blank mold cavities and a mold half-to-mold half component that is a bias value between the pair of blank mold portions used to form a corresponding blank mold cavity.

22. The system of claim 12, wherein the system for controlling vertical glass distribution in glass containers further includes:

a vertical glass distribution signature summer that compares the vertical glass distribution signature from the vertical glass signature extraction module to a vertical glass distribution signature set point to determine a vertical glass distribution signature error; and a parison stretch time control that controls the parison stretch time based on the vertical glass distribution signature error.

* * * * *